United States Patent [19]

Brumley

[11] 3,923,399
[45] Dec. 2, 1975

[54] MINIATURIZED SPECTROPHOTOMETER

[75] Inventor: Corwin H. Brumley, Penfield, N.Y.

[73] Assignee: Bausch & Lomb Incorporated, Rochester, N.Y.

[22] Filed: Apr. 25, 1974

[21] Appl. No.: 464,004

[52] U.S. Cl. ............................................. 356/96
[51] Int. Cl.² ......................................... G01J 3/42
[58] Field of Search ..................... 356/88, 93–97, 356/100

[56] References Cited
UNITED STATES PATENTS

| | | | |
|---|---|---|---|
| 2,613,572 | 10/1952 | Mathieu | 356/88 |
| 3,431,054 | 3/1969 | Doonan et al. | 356/100 |
| 3,701,589 | 10/1972 | Haines | 356/100 |
| 3,701,601 | 10/1972 | Plumpe et al. | 356/96 |

FOREIGN PATENTS OR APPLICATIONS

| | | | |
|---|---|---|---|
| 579,833 | 8/1946 | United Kingdom | 356/96 |

*Primary Examiner*—Alfred E. Smith
*Assistant Examiner*—F. L. Evans
*Attorney, Agent, or Firm*—Frank C. Parker; Bernard D. Bogdon; Harry C. Post, III

[57] ABSTRACT

The miniaturized spectrophotometer is compact, lightweight, ruggedly constructed for adaptive analytical study of liquid samples for use both in the field and in a laboratory. The spectrophotometer includes a readily replaceable light source for transmitting radiant flux along a light path in a self-contained monochromator. A mirror receiving the radiant flux reflects it along a light path disposed at a relatively small angle to the light path between the mirror and the light source. A diffraction grating disposed for receiving the light reflected from the mirror is pivotally controlled by a fixed-length nonadjustable sine bar. A sine bar control provides for selecting the wavelengths to pass through a sample compartment exit slit as a very narrow band width of radiation. The sample compartment assembly is removable from the main assembly of the spectrophotometer and is adaptable to accommodate multishaped sample containers. Electronic circuitry specific to the type of analytical study under consideration is encapsulated in the removable sample compartment. The main assembly of the spectrophotometer includes a replaceable battery power pack and electrical circuitry for generally providing digital or meter readout of the analytical transmittance and absorbance values of tested samples.

11 Claims, 5 Drawing Figures

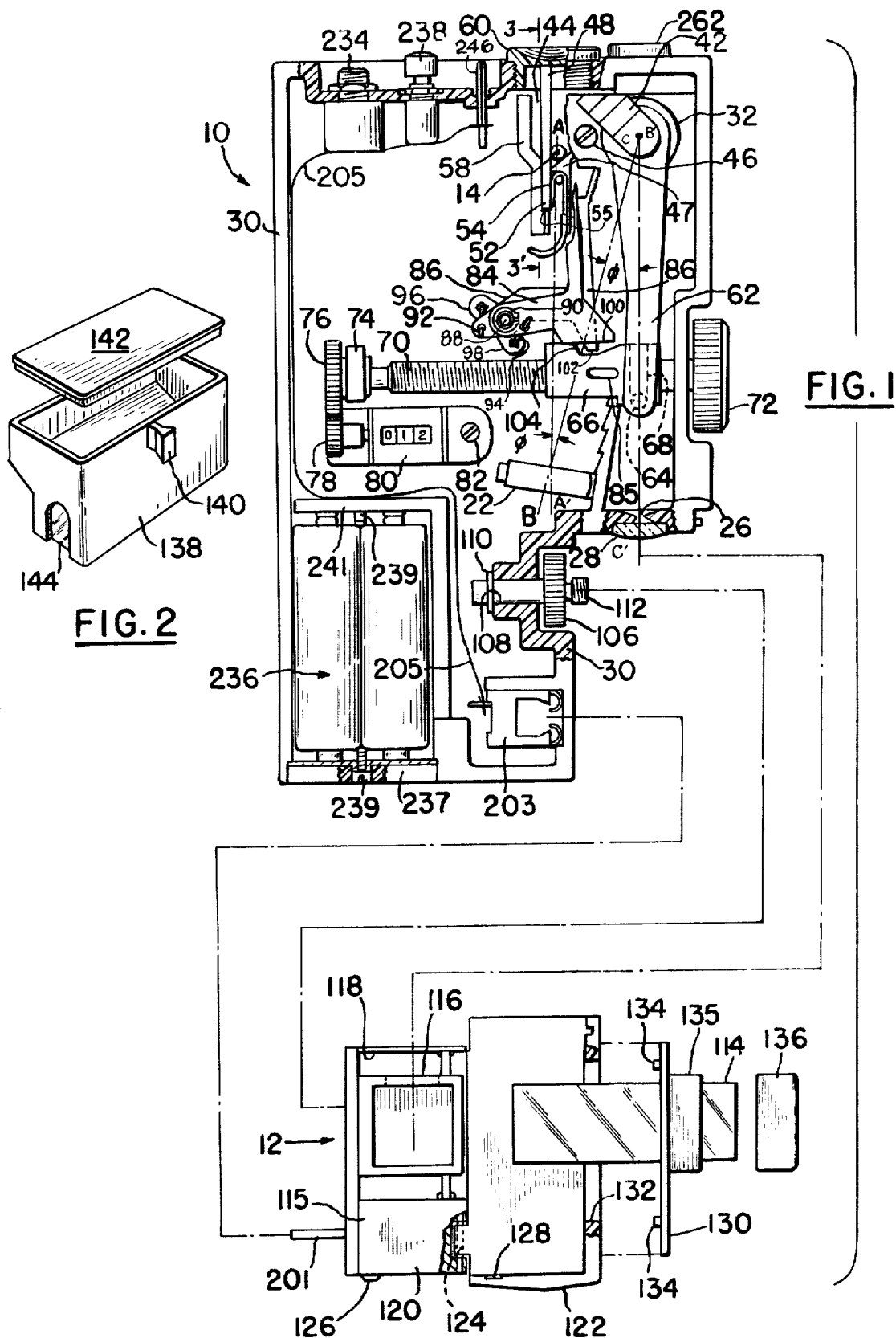

3,923,399

MINIATURIZED SPECTROPHOTOMETER

FIELD OF THE INVENTION

This invention relates to a spectrophotometric apparatus and in particular to a miniaturized portable spectrophotometer having a battery power pack as an electrical source of energy and a removable sample compartment with encapsulated electronic circuitry.

SUMMARY OF THE INVENTION

A spectrophotometer has a monochromator compactly contained in a main assembly and includes a digital or meter panel for displaying analytical transmittance and absorbance values of a liquid sample carried by a detachable sample compartment subassembly. A diffraction grating of the monochromator is pivotably controlled by manually rotating a wavelength selection knob connected to a nonadjustable fixed-length sine bar assembly. The monochromator has a wavelength range from 0 to 1000 nanometers to thereby include the ultraviolet, visible and infrared portions of the electromagnetic spectrum. Essentially yellow and blue filters are interposed into the beam of light near the removable light source to eliminate higher order wavelengths, to provide for smoothing out the light source gross radiant flux variations which vary with wavelength and to reduce stray radiation from the monochromatic radiant flux. Linearly dispersed light exits from the monochromator portion of the main assembly to be attenuated by the liquid sample contained within the removable sample compartment. The removable sample compartment has provision for incorporating varied sample containers including a sample bath cell, a test tube, vial or cuvette. Electronic circuitry encapsulated into the removable sample compartment generates a signal based on the attenuation of the sample under test to provide a direct readout digitally or on a meter face as a function of the selected wavelength. To be completely portable the main assembly of the spectrophotometer contains a replaceable battery power pack.

BRIEF DESCRIPTION OF THE DRAWINGS

FIG. 1 is an exploded plan view of a spectrophotometer according to the principles of the present invention;

FIG. 2 is a perspective view of a sample compartment for use in the spectrophotometer as illustrated in FIG. 1;

DESCRIPTION OF THE PREFERRED EMBODIMENT

Figure 3:
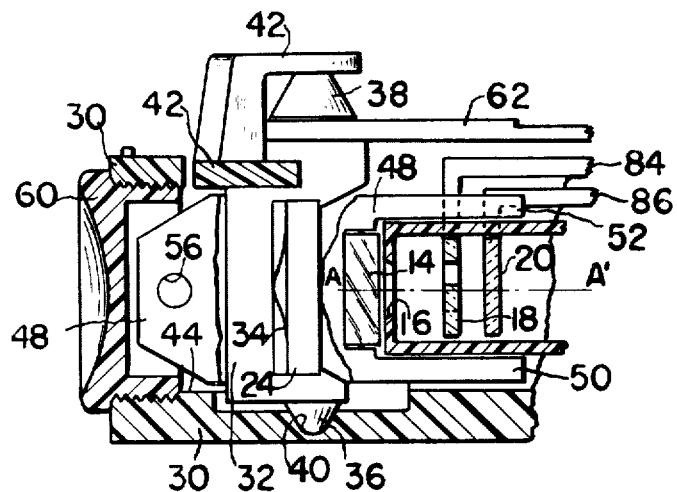
FIG. 3 is a sectional side view of a portion of the embodiment of FIG. 1 viewed along the plane of the line 3—3' in FIG. 1.

In a separate concurrently filed and copending design patent application entitled "Miniaturized Spectrophotometer", U.S. Ser. No. 464,006 for applicant Paul Hoogesteger, the exterior design is illustrated and it best depicts the compact physical arrangement of the controls, display areas and access provisions of the preferred embodiment of the miniaturized spectrophotometer.

The spectrophotometer has a main assembly 10 and a detachable sample compartment assembly 12, as illustrated in the exploded view of FIG. 1. The main assembly 10 includes a monochromator for providing monochromatic radiation for use in analytical testing of liquid samples carried by the sample compartment assembly 12. The optical components of the light path of the monochromator and their supports are best viewed in FIGS. 1 and 3. Electromagnetic radiation flux is emitted by a source of radiation 14 and is introduced into the monochromator system at entrance slit 16 to pass through optical filters 18 and 20 which are inserted at selective wavelength ranges for the flux to become incident upon a focusing mirror 22. Mirror 22 reflects the radiation to pivotable diffraction grating 24 which linearly disperses the radiation, to exit monochromatic light at selective wavelengths within a preferred band width through exit slit 26 and collective lens 28.

The electromagnetic radiation flux or light which includes wavelengths corresponding to the infrared, visible and ultraviolet rays traverses a Z shaped light path defined by imaginary lines A—A', B—B' and C—C' extending between the centers of the illuminating element of the radiation source 14, the focusing mirror 22, the reflecting surface of the diffraction grating 24 and the exit slit 26. In this portable compact spectrophotometer which has a weight of approximately 1 pound and exterior dimensions of approximately 6 inches by 3½ inches by 2 inches, it will be appreciated that the optical path B—B' between mirror 22 and the diffraction grating 24 forms small angles $\phi$ with both of the optical paths A—A' and C—C' extending between the radiation source 14 and the mirror 22 and diffraction grating 24 and exit slit 26, respectively. In the illustrated embodiment the angle is 14.5° and the optical elements of the monochromator, for the most part, are disposed at less than 80 millimeters from each other along the Z shaped light path.

It will be appreciated that the beforementioned optical components need to be fixedly disposed relative to each other to remain in the optical relationships described and in the present case establish the relationship relative to each other by being disposed relative to a single structural member of the spectrophotometer, a lower housing 30. In addition it will be appreciated that the Z shaped light path is unobstructed by the structural and optical components of FIG. 1 which, due to the plan view, may appear to intersect the light path.

The radiation source 14 or exciter lamp is an axial lamp having a tungsten filament longitudinally extending before the entrance slit 16, as best illustrated in FIG. 3. It will be appreciated from the illustration of FIG. 3 that the lamp is disposed relatively close to the entrance slit 16. The entrance slit 16 which is of rectangular shape provides for the focusing mirror 22 to be fixedly mounted to the lower housing 30 of the main assembly of the spectrophotometer, reflecting substantially all the light passing through the entrance slit 16. The exciter lamp is disposed before the entrance slit 16 to have the lamp filament totally fill the entrance slit opening when viewed from the focusing mirror 22.

The diffraction grating 24 is carried within a pivotable grating support 32 and held firmly in position thereat by a wave spring 34 bearing against the back side of the diffraction grating 24 and an upright surface of the support 32. The grating has 1200 grooves per millimeter and a preferred blaze angle of 14°. The grating support 32 has conically shaped pivots 36 and 38 disposed at opposite ends of the support 32. The pivots 36 and 38 defined a pivot axis which is parallel with the plane and the grooves of the grating 24. Conical pivot 36 engages lower housing 30 at a mating conical pivot bearing depression 40. The conical pivot 38 at the upper end engages a similar pivot bearing depression in a formed support arm and light shield 42 which covers a lamp compartment 44 housing the radiation source 14, as best seen in FIGS. 1 and 3. Fastener 46 secures the light shield to an interior wall 47 of the lower housing 30.

Radiation source 14 is included as a separate prealigned subassembly which permits quick and easy replacement of the lamp should it require substitution or replacement. In addition, should the instrument be chosen to act as a radiometer, the lamp assembly can quickly be extracted. The electrical terminals of the radiation source 14 are connected, such as by soldering, to a radiation source board 48 at printed circuit terminals disposed thereon to thereby affix the lamp position relative to the board to prealign it. The source board 48, as best seen in FIG. 3, is formed to include the printed electrical terminals on bifurcated extensions 50 and 52. As best seen in FIG. 1, the terminal of bifurcated extension 52 slidably electrically connects with an electrical terminal 54 engaged to the power source of the spectrophotometer. Although one electrical terminal 54 is shown in FIG. 1, it will be appreciated that a second like electrical terminal matingly engages the electrical printed terminal of bifurcated extension 50. When the radiation energy source board 48 is fully inserted into the lamp compartment 44 to dispose the filament before the entrance slit 16 as hereinbefore mentioned, the bifurcated extensions bottom against a structural stop 55. The radiation source 14, as was previously described, is then disposed relatively close before the radiation entrance slit 16. It will be appreciated that an opening 56 in the end of the energy source board 48 provides for easy removal of the board 48. A lamp access cover 60 threadably engages the lower housing 30 and, in cooperation with an interior wall 58 extending upward from the lower housing 30 and the interior wall 47, in addition to the light shield 42, makes the compartment 44 light-tight. Interior walls 47 and 58, in addition to acting as light shields, also engage to form the rectangularly shaped entrance slit 16 the edges of which approximate knife-edges. In addition, structural stop 55 is formed as a part of interior wall 58.

Fixedly engaged to the grating support 32, to pivot it about its axis, is a nonadjustable sine bar 62. Sine bar 62 includes a cylindrical boss extension 64 at that end opposite the grating support 32, to slidably engage a sine bar control nut 66 at a recessed slot 68. The sine bar control nut is threadably engaged to a lead screw 70 having at one end a bearing within the lower housing 30 extending outward therefrom to a wavelength control knob 72. The opposite end of the lead screw 70 bears within a support 74 extending upward from the lower housing 30 and extends therethrough to engage a rotary drive gear 76. Rotary gear 76 engages a driven gear 78 in direct connection with a wavelength counter 80 secured to the lower housing 30 by fastener 82. The wavelength counter 80 can be rotated to display wavelength readings from 0 to 999 nanometers.

As will be appreciated, the wavelength indicator drive gear 76, as does the lead screw 70, varies linearly, as a function of the sine of the grating angle. Therefore, when the control knob 72 is rotated a number of turns to a selected wavelength, as indicated on the wavelength counter 80, the sine bar 62 in cooperation with the moving sine bar control nut 66 pivotably moves the diffraction grating 24 to provide for monochromatic light of the selected wavelength at the exit slit 26. A boss 85 extends upward from the sine bar control nut 66 to engage an upper housing to preclude turning of the nut 66 as the lead screw 70 is rotated. It will be appreciated that the upper housing provides the top facade for the instrument including the mentioned controls and read-out display and is secured to the lower housing 30 in a conventional manner.

The linear relationship between the movement of the control knob 72 and the corresponding monochromatic light focused at the exit slit 26, exists throughout the instrument wavelength range from 0 to 1000 nanometers. The linear relationship exists due to the constant angle between incident and emergent radiation on the diffraction grating 24. Unlike many precision instruments where wavelength calibration is necessary, the present invention, due to such things as the prealigned lamp assembly and precision molded or formed component parts, does not require calibration and as a result a nonadjustable sine bar can be incorporated without jeopardizing the accuracy and resolution of the analytical test results and a wavelength accuracy of plus or minus 3 nanometers at 546 nanometers is readily ascertainable.

The essentially yellow and blue filters 18 and 20, respectively, are inserted into and removed from the optical path A—A' as a function of a surface shape of the bar control nut 66 and its disposition. As will be appreciated from FIGS. 1 and 3, filters 18 and 20 are respectively an extended part of cam follower arms 84 and 86 which pivot about a pivot post 88 extending upward from the lower housing 30. A fastener 90 secures cam follower arms 84 and 86 about the pivot post 88. Springs 92 and 94 extend upward from spring mounting bosses 96 and 98, respectively, both bosses of which extend upward from the lower housing 30. The springs 92 and 94 bias the filter cam follower arms 84 and 86 toward the lead screw 70 and/or the sine control nut 66. The filters 18 and 20 are in or out of the optical path A—A' as a function of the disposition of cam follower surfaces 100 and 102 of cam followers 84 and 86, respectively. The sine bar control nut 66 has a cam surface 104 which determines the disposition of cammed surfaces 100 and 102 and filters 18 and 20, respectively. The cam surface 104 extends the length of the sine bar control nut 66 in the direction of the lead screw 70.

As illustrated in FIG. 1, the sine bar control nut 66 is disposed at a position which represents a lower wavelength reading such as 012 nanometers indicated on wavelength counter 80 and the yellow and blue filters, respectively, are removed from the optical path A—A'. At the lower order wavelengths and specifically at the 000 wavelength reading, the yellow and blue filters 18 and 20 are removed from the light path in order to provide for zero order transmittance adjustment of the meter. The meter is provided with a zero control for adjustment of the indicator needle of the meter to 0% transmittance when the sample compartment is occluded.

The blue filter 20 is inserted into the light path A—A' as the cam follower surface 102 rides up the sine bar control nut cam surface 104 when the control knob 72 is rotated to increase the wavelength reading and the blue filter 20 remains in the light path up to approximately 460 nanometers. The cam follower surface 100 for the yellow filter 18 similarly is controlled by the disposition of the sine bar control nut 66 and provides for keeping the yellow filter 18 out of the optical path A—A' until approximately 580 nanometers. The yellow filter 18 remains in the path of the radiant flux up to 1000 nanometers. As hereinbefore mentioned, the inclusion of the yellow filter 18 is to eliminate stray light and the higher order wavelengths and to decrease the adverse optical spectrum therefrom. The blue filter 20 is incorporated to eliminate the stray light effect throughout the near ultraviolet region of the spectrum.

As will be appreciated from this description of the monochromator of the main assembly 10 of the preferred embodiment of the spectrophotometer, monochromatic light can thereby be provided at collective lens 28 for use in analytical analysis of liquid samples. As already stated the sample compartment assembly 12 is detachable from the main assembly 10 and the main assembly 10 is capable of providing monochromatic light through the collective lens 28. It will be appreciated that the instrument can be used for other than analytically testing of liquid samples when the sample compartment 12 is detached. Specific to the preferred embodiment, however, sample compartment 12 is able to be attached and detached to the main assembly 10 by manual manipulation of a locking screw knob 106. The knob 106 is accessible at the exterior bottom side of lower housing 30. Knob 106 has a bearing shaft free to rotate within opening 108 of lower housing 30 and is retained thereat by a fastener 110. Threaded screw 112 extends from knob 106 to threadably engage a mating nut encapsulated within sample compartment assembly 12.

Figure 4:
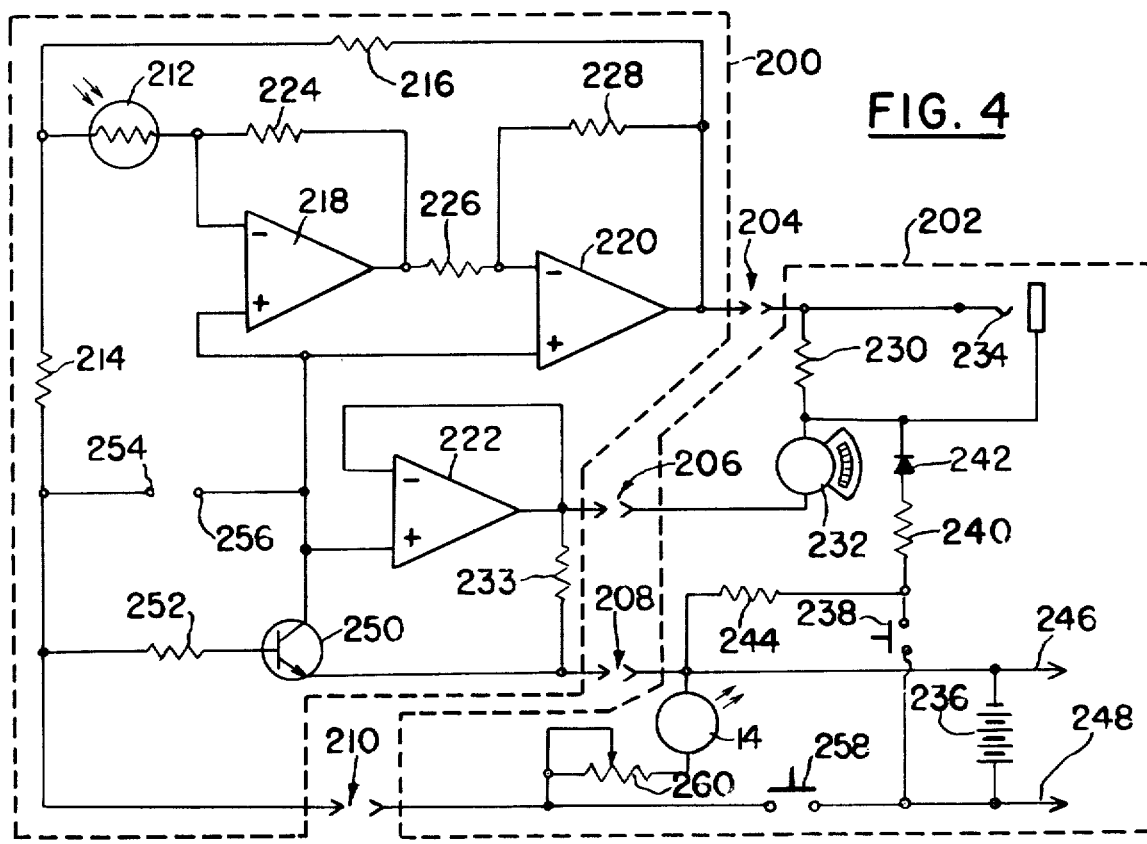
FIG. 4 is a schematic illustration of a meter readout electrical circuit of the embodiment of FIG. 1.

It will be appreciated that sample compartment assembly 12 is adapted to accommodate numerous sizes and shapes of liquid containers at a compartment housing 115. Typically illustrated, in the exploded view of the lower portion of FIG. 1, is a rectangularly shaped cuvette which has a square opening therein for introducing liquid samples. A square shaped adaptor 116 is insertable within the sample compartment chamber 118 of the compartment housing 115. The adaptor 116 has optical path openings provided to accommodate the monochromatic light along path C—C' to allow transmission of the radiant flux to the cuvette 114 and onto a photoresistor sensor encapsulated within the compartment housing 115. A portion of the schematically illustrated electronic circuitry of FIG. 4 is encapsulated within the compartment housing 115 at a potted section 120.

From FIG. 1 it will be appreciated that the sample compartment assembly 12 has a hinged cover 122 pivotable outward from the compartment housing 115. A hinge pin 124 matingly engages hinge protrusions extending from the cover 122 and the compartment housing 115. As illustrated in FIG. 1 the hinged area is at the lower portion of the compartment housing 115 so that when the cover 122 is disposed as illustrated in FIG. 1, the sample compartment chamber 118 is open at the top and on the side next to the cover 122. When the cover 122 is closed, a notch 128 disposed at an inner surface of a side wall of the cover 122 engages a tab 126 of the housing 115 and locks the cover 122 into position.

After an appropriate adaptor, such as adaptor 116 as illustrated in FIG. 1 has been slidably inserted into compartment chamber 118 and after the cover 122 is closed, a cover insert corresponding to the adaptor in use is selected, such as the cover insert 130 of FIG. 1, and is snapped into an accommodating opening 132 in the top portion of the cover 122. Tabs 134 secure the cover insert 130 within the opening 132. When the cover 122 is closed, a liquid sample for testing is introduced into an appropriate corresponding container, such as the cuvette 114 illustrated in FIG. 1. The cuvette 114 is then passed through an accommodating opening within an extension 135 of the insert 130 and down into the adaptor 116. The cuvette 114 rests upon the bottom of the compartment housing 115 in position to receive the monochromatic light passing therethrough to carry out the analysis of the liquid sample. In order to preclude stray light from entering the cuvette 114, a cap 136 having an appropriate configuration to accommodate the cuvette 114 is placed over the cuvette opening to rest upon extension 135 of the cover insert 130.

It will be appreciated that other sample containers of more convenience for certain testing may be used and be of other configurations. Appropriate sample compartment adaptors, cover inserts, and container caps are used in order to accommodate these other configurations, which, for example, may be round in cross-section and/or provide a different length path through the liquid sample.

FIG. 2 illustrates a sample compartment cell 138 which by its handle 140 can easily be inserted into the sample compartment chamber 118 in order to accommodate testing of liquid samples where other standard containers like test tubes are not satisfactory or available. A cover 142 seals the liquid sample within the sample compartment cell 138. Optical windows 144 are disposed at opposite ends of the sample compartment cell 138 to permit the monochromatic light to pass therethrough. It will be appreciated that when the cell 138 of FIG. 2 is in use, adaptors such as adaptor 116 are not included in the sample compartment chamber 118.

That portion of the electronic circuit of FIG. 4 which is encapsulated at the potted section 120 of the compartment housing 115, is designated as sample compartment electrical circuit 200 and terminates at a printed circuit terminal board 201 which preferably includes the male portion of mating terminals 204, 206, 208 and 210, respectively. A printed circuit board connector 203 is contained within the lower housing 30 to engage the printed circuit board 201 and includes the corresponding mating female connectors for terminals 204, 206, 208 and 210, respectively. Flexible electrical wire circuitry 205 is connected to the printed circuit board connector 203 and incorporates the electrical wire of the schematically illustrated electrical circuit 202 incorporated into the main assembly 10 of the spectrophotometer.

FIG. 4 illustrates the schematic electrical circuit diagram of the battery powered portable spectrophotometer of FIG. 1. The left portion of the circuit diagram illustrates the encapsulated sample compartment electrical circuit 200 potted in the detachable sample compartment assembly 12. The electrical circuitry of the portable spectrophotometer which is included within the main assembly of the portable spectrophotometer circuit 202, is schematically illustrated at the right portion of FIG. 4.

In the encapsulated sample compartment electrical circuit 200, a photoresistor 212 acts as a signal receiver for the attenuated transmitted energy flux exiting from the monochromator portion of the main assembly 10 and passing through the liquid sample under analysis in the sample compartment chamber 118. The photoresistor 212, for example, is comprised of cadmium sulfide material and has a high degree of sensitivity and is preferred to have a substantially linear output. Also encapsulated in the sample compartment electrical circuit 200 is a quad operational amplifier similar in most respects to typical operational amplifiers but different from the standpoint that the provided inputs to included amplifiers 218, 220 and 222 are voltage based as opposed to being electrical currents. The fourth amplifier of the quad amplifier is not utilized. Since the electrical circuit 200 lacks a ground reference, a common reference is established by the amplifier 222. The amplifier 222 provides output feedback to its negative terminal to establish a common voltage at the negative terminals of amplifiers 218, 220 and 222.

A positive voltage provided at the photoresistor 212, by a voltage divider consisting of resistors 214 and 216, is a more positive voltage than the base emitter negative terminal of amplifier 218 which has a potential equal to that developed by amplifier 222 acting to establish the common reference. A current at the photoresistor 212 equal to the difference in the voltage across the photoresistor 212 divided by the resistance of the photoresistor 212 is thereby established. Typically, the energy flux, which passes through the liquid sample to impinge upon the sensor material of the photoresistor 212, varies the resistance of the sensor material in inverse relationship to the amount of incident energy flux. This current, which is then a function of the properties of the liquid sample under analytical test, is treated by the amplifier 218 in a conventional manner and provides an output current as a function of the value of resistor 224. Amplifier 220 operates as a standard operational amplifier and has an amplification which is dependent upon the value of resistor 226 and feedback resistor 228. The output current from amplifier 220 is fed back through resistor 216, to cancel any inherent nonlinearity of the photoresistor 212. The photoresistor 212 is assumed to have an average nonlinearity characteristic. The positive feedback through resistor 216 operates on both sides of the average nonlinearity signal to effectively nullify the nonlinearity characteristic of the photoresistor. As the light through the sample increases, the photocell resistance decreases and the signal out of the second stage amplifier 220 increases. As a result, the voltage across the photoresistor 212 increases to thereafter increase the overall signal and the gain.

To provide for a resultant readout, the output current from the operational amplifier 220 is fed through resistor 230 and through the meter 232. The resistance of meter 232 is much less than the resistance of resistor 230 and the meter 232 has a 1 milliampere full scale reading. It will be appreciated that the voltage across resistor 230 provides a voltage for an accessory output connected to output jack 234. The preferred embodiment provides an accessory output voltage of ½ volt for 100% transmittance. A typical accessory for use with the spectrophotometer would include a graphical recorder for making a permanent record of the analytical test results.

A resistor 233 connected to the output of low impedance amplifier 222 has a current requirement of a level to keep the output voltage constant. This compensates for the amplifier 222 not being able to draw all of the current required by the meter 232, for example, when a full milliampere is being passed through the meter 232. It will be appreciated that a simple and small digital display can be substituted for the meter 232, as hereinafter disclosed in reference to FIG. 5.

The power pack consists of 4 nickel-cadmium AA size cells 236 to provide a voltage supply of 5 to 6 volts nominally. In operation the power supply level is regularly checked by means of a battery check circuit including switch 238, resistor 240 and diode 242. As shown in FIG. 1 of the preferred embodiment, battery check switch 238 is physically included at the back side of lower housing 30 and is spring biased to a normally "OFF" position. A resistor 244 provides a load for the battery power pack 236 during the battery check operation in order to prevent a false positive reading for the state of the batteries if one of the battery cells 236 have a relatively low voltage level. The current provided passes through a diode operating resistor 240 to then pass through the diode 242 and on through the meter 232 to produce a meter reading with the indicator needle at a predetermined scale position providing the batteries are at a satisfactory voltage level. The purpose of the diode 242 is to prevent the output current of amplifier 220 passing through resistor 230, from flowing back into the battery check circuit. If a battery check reading is subnormal, then the batteries pack 236 should be charged using an appropriate charger depending on the availability of an alternating current voltage source of 115 volts or 230 volts or direct current source of 12 volts. The battery charger is connected to electrical terminals 246 and 248 illustrated in FIG. 4 and which terminals are located at the back side of the main assembly 10 as indicated by FIG. 1. A full charge takes approximately 14–16 hours.

If it becomes necessary to replace or remove and later insert the batteries 236 and if, in error, the batteries are incorrectly inserted, a transistor 250 will recognize this error and prevent operation of the system and thereby safeguard it. For normal testing operation, transistor 250, in cooperation with resistor 252, which operates the transistor 250, saturates and essentially appears as a short circuit.

Internally the quad operational amplifiers 218, 220 and 222 all include a positive voltage supply connection schematically illustrated as positive terminal 254 with a negative voltage supply connection provided at the terminal 256. The battery power pack 236 is retained in place by a removable battery compartment access cover 237 which includes spring biased electrical contact posts on its inside surface to interconnect the batteries of the power pack 236 and load the batteries against a battery terminal board 241 extending upward from the lower housing 30 at the opposite end of the batteries. The access cover 237 is secured by means of a long screw fastener 239 extending from the cover 237 to the battery terminal contact board 241.

The radiant energy source 14 is variably operated at a voltage level to provide sufficient illumination for the wavelength under consideration during the testing period. Zero adjustment of the meter 232 is made prior to the liquid sample or its test container being inserted into the sample compartment chamber 118. To adjust for 100% transmittance or full scale, a reagent blank is inserted into the compartment chamber 118. Afterwards, by manually closing an electrical test switch 258, and manipulating a potentiometer 260, the indicator needle of the meter 232 is adjusted for 100% transmittance or full scale. The switch 258 is spring biased in a normally open position and can be depressed for momentary contact to complete the circuit during testing of a liquid sample. With a slight slide motion the switch can be temporarily locked in an "ON" position during a test, for example, to free the operator to record the test results.

A lanyard socket 262 provides for secure mounting of the spectrophotometer such as in a tripod for field use. In addition, it will be appreciated that although the meter scale of 232 is generally printed in linear increments, for readout of transmittance, an applique having a logarithmic scale can be laid over the transmittance scale for easy reading of absorbance values during analytical testing.

Figure 5:
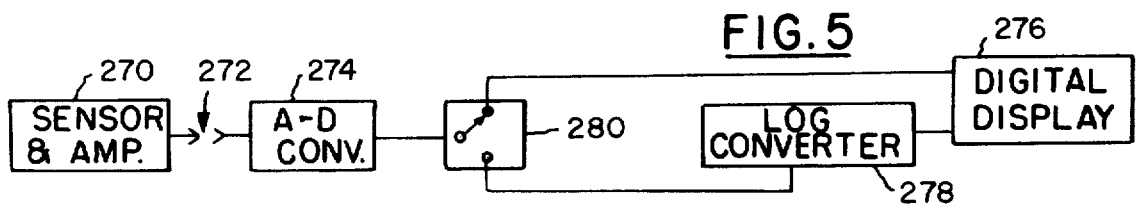
FIG. 5 is a block diagram of an alternate electrical circuit for digital readout for the embodiment of FIG. 1.

FIG. 5 illustrates a block diagram of an electrical circuit for providing a digital display of analytical test results from a liquid sample within the miniaturized spectrophotometer. A sensor and amplifier circuit 270 deviates very little in concept from the before disclosed sample compartment electrical circuit 200 and is adapted for encapsulating within sample compartment assembly 12. Like the circuit 200, sensor and amplifier circuit 270 is provided with a male portion of a mating terminal assembly 272 for electrically engaging that part of the digital display circuits carried within the main assembly 10. An analog signal is fed from circuit 270 to an analog to digital converter circuit 274 to provide a digital signal for display at a digital display assembly 276. To provide for a direct digital readout for absorbance results, a log converter circuit 278 is in the line to intercept the digital signal leaving the analog to digital converter circuit 274. A switch 280 is provided to direct the digital signal directly to the digital display 276 for a transmittance readout, as illustrated in FIG. 5, or through the log converter 278 for an absorbance readout.

It will be appreciated that test, illuminating, power pack, charging and other circuit provisions, as provided in the embodiment of FIG. 4, may also be provided when a digital display is in use. The elements and components for practicing the alternate embodiment of FIG. 5 are well known in the art at the present time.

The principles of a converter for use in the circuit of FIG. 5 is disclosed in IEEE Transactions On Instrumentation and Measurement of February 1971, Volume 1M-20, Number 1. Information on other parts and elements of the circuit is also readily available. Light emitting diodes or liquid crystals, for example, are both suitable for the digital display.

Whenever possible throughout the preferred embodiment of the instrument all parts are preferably constructed of ejection molded plastic materials which are generally resistant to attack by most chemicals. Such a suggested material includes polypteraphlate. An acceptable material is marketed by Eastman Kodak Company under the trademark Tenite.

What is claimed is:

1. A miniaturized spectrophotometer used in analyzing a liquid sample, comprising:
   a main assembly housing having an exteriorly accessible locking screw knob for attaching and detaching a separate liquid sample compartment housing;
   a monochromator carried within said main housing including a light source and a diffraction grating for emitting monochromatic electromagnetic flux at selective wavelengths;
   a separate liquid sample compartment housing detachably connected by the locking screw knob to said main housing for receiving the monochromatic flux used in analyzing a liquid sample;
   a separate removable liquid sample container disposed within said sample compartment housing for carrying a liquid sample and receiving the monochromatic flux;
   a photosensor and an amplifier circuit carried within said sample compartment housing for receiving attenuated flux and generating an output signal as a function of the attenuated flux;
   meter means carried within said main housing and detachably electrically connected to the amplifier circuit for providing a readout as a function of the output signal; and
   a rechargeable battery power pack carried within said main housing for energizing the light source and amplifier circuit.

2. The spectrophotometer as defined in claim 1, wherein the light source comprises a prefocused lamp.

3. The spectrophotometer as defined in claim 2, wherein the prefocused lamp is mechanically and electrically connected to a lamp housing board insertable into the main assembly housing to axially extend before a light entrance slit defined by the main assembly housing.

4. The spectrophotometer as defined in claim 1, wherein the diffraction grating for emitting monochromatic electromagnetic flux at selective wavelengths is pivotally controlled by a manual control including a nonadjustable sine bar extending between a sine bar control nut and the diffraction grating.

5. The spectrophotometer as defined in claim 1, wherein the separate removable liquid sample container comprises a sample compartment cell providing a long path for the liquid sample for attenuating the electromagnetic flux passing through a liquid sample in the cell.

6. The spectrophotometer as defined in claim 1, wherein the monochromator further includes a substantially yellow filter and a substantially blue filter to eliminate higher order wavelengths and stray light, respectively.

7. The spectrophotometer as defined in claim 1, wherein the means for providing a meter readout includes a meter having a scale incremented to provide a readout as a function of the received output signal and the attenuated flux passing through the liquid sample.

8. The spectrophotometer as defined in claim 1, wherein the means for providing a meter readout includes a digital meter for providing a digital display readout as a function of the received output signal and the attenuated flux passing through the liquid sample.

9. The spectrophotometer as defined in claim 1, wherein the main assembly housing includes a mounting means compatible to receive a fixture for secure mounting of the spectrophotometer.

10. The spectrophotometer as defined in claim 1, further including a light source control for controlling the intensity of the light source as a function of the selective wavelengths.

11. A miniaturized spectrophotometer for analyzing a liquid sample, comprising:
   a main assembly housing;
   a monochromator carried within said main housing for emitting monochromatic electromagnetic flux at selected wavelengths, including a light source for emitting the electromagnetic flux, a light source control for controlling the intensity of the light source as a function of the selected wavelengths, a pivotally controlled diffraction grating having a nonadjustable sine bar extending between a sine bar control nut and the diffraction grating, and a substantially yellow filter and a substantially blue filter to eliminate higher order wavelengths and stray light;
   a separate liquid sample compartment housing detachably connected to said main housing for receiving the monochromatic flux used in analyzing a liquid sample;
   a separate removable liquid sample container disposed within said sample compartment housing for, carrying a liquid sample and receiving the monochromatic flux;
   a photosensor and an amplifier circuit carried within said sample compartment housing for receiving attenuated flux and generating an output signal as a function of the attenuated flux;
   meter means carried within said main housing and detachably electrically connected to the amplifier circuit for providing a digital readout as a function of the amplifier circuit output carried; and
   a rechargeable battery power pack carried within said main housing for energizing the light source and amplifier circuit.

* * * * *